US010457793B2

(12) United States Patent
Nayrat

(10) Patent No.: US 10,457,793 B2
(45) Date of Patent: *Oct. 29, 2019

(54) TIRE COMPRISING A COMPOSITION COMPRISING A POLYFUNCTIONAL ACRYLATE DERIVATIVE AND A PEROXIDE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Delphine Nayrat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/538,347

(22) PCT Filed: Dec. 21, 2015

(86) PCT No.: PCT/EP2015/080817
§ 371 (c)(1),
(2) Date: Jun. 21, 2017

(87) PCT Pub. No.: WO2016/102480
PCT Pub. Date: Jun. 30, 2016

(65) Prior Publication Data
US 2017/0349728 A1 Dec. 7, 2017

(30) Foreign Application Priority Data
Dec. 22, 2014 (FR) ..................................... 14 63045

(51) Int. Cl.
*B60C 1/00* (2006.01)
*C08K 5/103* (2006.01)
*C08K 5/14* (2006.01)
*C08K 3/04* (2006.01)
*C08K 5/00* (2006.01)

(52) U.S. Cl.
CPC .............. *C08K 5/14* (2013.01); *B60C 1/0016* (2013.01); *C08K 3/04* (2013.01); *C08K 5/0016* (2013.01); *C08K 5/103* (2013.01)

(58) Field of Classification Search
CPC .......... C08K 5/14; C08K 3/04; C08K 3/0016; C08K 5/103; B60C 1/00
USPC ....................................................... 524/575
See application file for complete search history.

(56) References Cited

U.S. PATENT DOCUMENTS

| 5,227,425 | A | 7/1993 | Rauline | 524/493 |
| 5,852,099 | A | 12/1998 | Vanel | 524/494 |
| 5,900,449 | A | 5/1999 | Custodero et al. | 524/430 |
| 5,977,238 | A | 11/1999 | Labauze | 524/492 |
| 6,013,718 | A | 1/2000 | Cabioch et al. | 524/506 |
| 6,245,861 | B1* | 6/2001 | Class | C08K 5/14 525/332.5 |
| 6,420,488 | B1 | 7/2002 | Penot | 525/332.7 |
| 6,503,973 | B2 | 1/2003 | Robert et al. | 524/492 |
| 6,536,492 | B2 | 3/2003 | Vasseur | 152/450 |
| 6,774,255 | B1 | 8/2004 | Tardivat et al. | 556/427 |
| 6,815,473 | B2 | 11/2004 | Robert et al. | 523/215 |
| 7,217,751 | B2 | 5/2007 | Durel et al. | 524/262 |
| 7,250,463 | B2 | 7/2007 | Durel et al. | 524/492 |
| 7,300,970 | B2 | 11/2007 | Durel et al. | 524/493 |
| 7,312,264 | B2 | 12/2007 | Gandon-Pain | 524/236 |
| 7,335,692 | B2 | 2/2008 | Vasseur et al. | 524/312 |
| 7,488,768 | B2 | 2/2009 | Tardivat et al. | 524/262 |
| 7,491,767 | B2 | 2/2009 | Durel et al. | 524/493 |
| 7,820,771 | B2 | 10/2010 | Lapra et al. | 525/479 |
| 8,344,063 | B2 | 1/2013 | Marechal et al. | 524/571 |
| 8,455,584 | B2 | 6/2013 | Robert et al. | 524/505 |
| 8,492,475 | B2 | 7/2013 | Araujo Da Silva et al. | 524/552 |
| 8,883,929 | B2 | 11/2014 | Gandon-Pain et al. | 525/326.5 |
| 9,010,393 | B2 | 4/2015 | Araujo Da Silva et al. | C08K 5/5465 |
| 2001/0034389 | A1 | 10/2001 | Vasseur | 524/137 |
| 2001/0036991 | A1 | 11/2001 | Robert et al. | 524/492 |
| 2002/0033217 | A1* | 3/2002 | Kanenari | B32B 25/14 152/516 |
| 2002/0062894 | A1 | 5/2002 | Miner et al. | 152/517 |
| 2002/0183436 | A1 | 12/2002 | Robert et al. | 524/492 |
| 2003/0065076 | A1 | 4/2003 | Hellens et al. | |
| 2004/0051210 | A1 | 3/2004 | Tardivat et al. | 264/349 |
| 2004/0127617 | A1 | 7/2004 | Vasseur et al. | 524/318 |
| 2004/0132880 | A1 | 7/2004 | Durel et al. | 524/262 |
| 2005/0004297 | A1 | 1/2005 | Durel et al. | 524/493 |
| 2005/0016650 | A1 | 1/2005 | Durel et al. | 152/209.1 |
| 2005/0016651 | A1 | 1/2005 | Durel et al. | 152/209.1 |
| 2005/0084638 | A1 | 4/2005 | Kerstetter, III et al. | 428/36.1 |

(Continued)

FOREIGN PATENT DOCUMENTS

EP 0 501 227 A1 9/1992
EP 0 735 088 A1 10/1996
(Continued)

*Primary Examiner* — Kelechi C Egwim
(74) *Attorney, Agent, or Firm* — Venable LLP

(57) ABSTRACT

A tire comprises a rubber composition based on at least one diene elastomer, a reinforcing filler, a specific polyfunctional acrylate derivative and a peroxide, the contents of polyfunctional acrylate derivative and of peroxide being such that the ratio of the content of polyfunctional acrylate derivative to the content of peroxide is greater than or equal to 6.

25 Claims, No Drawings

(56) References Cited

U.S. PATENT DOCUMENTS

| | | |
|---|---|---|
| 2005/0247391 A1* | 11/2005 | Ikuta .................. B60C 1/00 152/565 |
| 2006/0089445 A1 | 4/2006 | Gandon-Pain ................. 524/492 |
| 2008/0132644 A1 | 6/2008 | Lapra et al. .................. 525/105 |
| 2009/0186961 A1 | 7/2009 | Araujo Da Silva et al. ................. 523/150 |
| 2009/0194225 A1 | 8/2009 | Ikuta ............................ 156/123 |
| 2009/0234066 A1 | 9/2009 | Araujo Da Silva et al. ................. 524/571 |
| 2009/0270558 A1 | 10/2009 | Gandon-pain et al. ....... 525/190 |
| 2010/0022714 A1 | 1/2010 | Varagniat et al. ............ 525/209 |
| 2010/0184912 A1 | 7/2010 | Marechal et al. ............ 524/571 |
| 2010/0249270 A1 | 9/2010 | Robert et al. ................. 523/150 |
| 2010/0252156 A1 | 10/2010 | Robert et al. .............. 152/209.1 |
| 2010/0282383 A1 | 11/2010 | Ikuta ............................ 152/151 |
| 2011/0152458 A1 | 6/2011 | Araujo Da Silva et al. ................. 525/102 |
| 2012/0208948 A1 | 8/2012 | Gandon-Pain et al. ...... 524/521 |
| 2012/0252928 A1 | 10/2012 | Marechal et al. ............ 523/155 |
| 2015/0203668 A1 | 7/2015 | Bedard et al. |
| 2016/0243896 A1 | 8/2016 | Vasseur et al. ....... B60C 1/0016 |

FOREIGN PATENT DOCUMENTS

| | | |
|---|---|---|
| EP | 0 810 258 A1 | 12/1997 |
| EP | 1 127 909 A1 | 8/2001 |
| EP | 1 552 965 A1 | 7/2005 |
| FR | 2 740 778 A1 | 5/1997 |
| FR | 2 765 882 A1 | 1/1999 |
| GB | 2 360 784 A | 10/2001 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/002648 A1 | 1/2003 |
| WO | 03/002649 A1 | 1/2003 |
| WO | 03/16387 A1 | 2/2003 |
| WO | 2004/096865 A2 | 11/2004 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |

* cited by examiner

TIRE COMPRISING A COMPOSITION COMPRISING A POLYFUNCTIONAL ACRYLATE DERIVATIVE AND A PEROXIDE

FIELD OF THE INVENTION

The invention relates to tyres and more particularly to those comprising a composition which comprises a polyfunctional acrylate derivative and a peroxide.

RELATED ART

Compositions comprising zinc diacrylate derivatives are described in some documents of the state of the art for objects which are not tyres. For example, the document US 2003/0065076 describes compositions for military tank tracks comprising an elastomer, a reinforcing filler, zinc diacrylate or zinc dimethacrylate, and a peroxide, with the effect of an improvement in the abrasion resistance.

Likewise, the document US 2005/0084638 describes compositions of mixtures for covering an air sleeve for suspensions, also comprising an elastomer, a reinforcing filler, zinc diacrylate and a peroxide.

In the specific field of tyres, since fuel savings and the need to protect the environment have become a priority, it has proved necessary to produce tyres having a reduced rolling resistance, without adversely affecting the other properties of the tyre. This constraint, true in all tyre compositions, is particularly pronounced for tyre treads. Manufacturers have developed tyre compositions which make it possible to reduce this rolling resistance, in various ways and in particular by the introduction of silica into the mixtures as reinforcing filler.

Nevertheless, manufacturers are always looking for solutions for further lowering the rolling resistance of tyre treads and it is in this context that the applicant companies have discovered, surprisingly, that the hysteresis can be markedly decreased in rubber compositions for tyres, with a reduced content of reinforcing filler, the composition comprising a polyfunctional acrylate derivative and a peroxide, provided that a suitable ratio of the content of peroxide to the content of polyfunctional acrylate derivative is adopted.

Furthermore, this solution exhibits numerous other advantages in comparison with the compositions of the prior art and in particular an improved resistance to ageing under thermal and thermal/oxidizing conditions.

BRIEF DESCRIPTION OF EMBODIMENTS OF THE INVENTION

The invention thus relates to a tyre comprising a rubber composition based on at least one diene elastomer, a reinforcing filler, a polyfunctional acrylate derivative of formula (Ia) or (Ib):

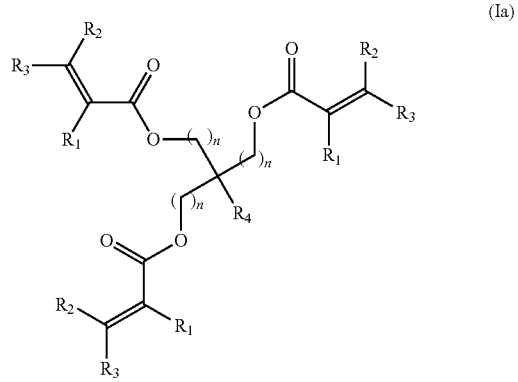

(Ia)

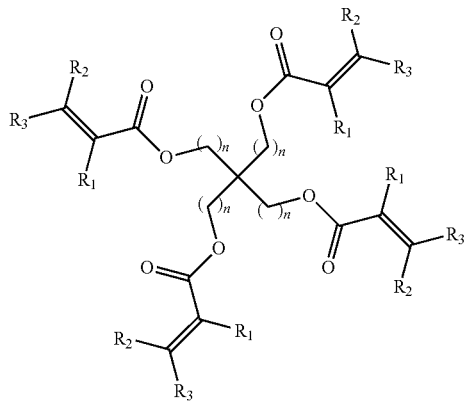

(Ib)

in which $R_1$, $R_2$ and $R_3$ independently represent a hydrogen atom or a $C_1$-$C_7$ hydrocarbon group selected from the group consisting of linear, branched or cyclic alkyls, aralkyl groups, alkylaryl groups and aryl groups and optionally interrupted by one or more heteroatoms, it being possible for $R_2$ and $R_3$ to together form a nonaromatic ring, n represents an integer having the value 1, 2 or 3 and, in the case of a polyfunctional acrylate derivative of formula (Ia), $R_4$ represents a radical selected from the group consisting of a hydrogen atom, a methyl group, an ethyl group, a propyl group or an isopropyl group, said composition additionally comprising a peroxide, the contents of polyfunctional acrylate derivative and of peroxide being such that the ratio of the content of polyfunctional acrylate derivative to the content of peroxide is greater than or equal to 6.

Preferably, the invention relates to a tyre as defined above in which $R_1$, $R_2$ and $R_3$ independently represent a hydrogen atom or a methyl group. Preferably, $R_2$ and $R_3$ each represent a hydrogen atom. Preferably again, $R_1$ represents a methyl group. Preferably again, n represents the integer 1.

According to a preferred embodiment, the invention relates to a tyre as defined above in which the polyfunctional acrylate derivative is a compound of formula (Ia). Preferably, $R_4$ represents an ethyl group.

According to another preferred embodiment, the invention relates to a tyre as defined above in which the polyfunctional acrylate derivative is a compound of formula (Ib).

Preferably, the invention relates to a tyre as defined above in which the amount of polyfunctional acrylate derivative in the composition is within a range extending from 10 to 70 phr (parts by weight per hundred parts by weight of elastomer), preferably from 10 to 60 phr.

Preferably, the invention relates to a tyre as defined above in which the peroxide in the composition is an organic peroxide. Preferably, the amount of peroxide in the composition is less than or equal to 3 phr. More preferably, the amount of peroxide in the composition is within a range extending from 0.1 to 3 phr. Preferably, the amount of peroxide in the composition is within a range extending from 0.2 to 2 phr, preferably from 0.25 to 1 phr.

Preferably, the invention relates to a tyre as defined above in which the ratio of the content of polyfunctional acrylate derivative to the content of peroxide is greater than or equal to 7, preferably greater than or equal to 8 and more preferably greater than or equal to 10. More preferably, the ratio of the content of polyfunctional acrylate derivative to the content of peroxide is between 10 and 110, preferably between 10 and 70 and more preferably between 10 and 40.

Preferably, the invention relates to a tyre as defined above in which the diene elastomer is selected from the group consisting of polybutadienes, synthetic polyisoprenes, natural rubber, butadiene copolymers, isoprene copolymers and the mixtures of these elastomers. Preferably, the diene elastomer is selected from the group consisting of polybutadienes, synthetic polyisoprenes, natural rubber, copolymers of butadiene and styrene, copolymers of butadiene and acrylonitrile, copolymers of isoprene and styrene, and the mixtures of these elastomers.

Preferably again, the invention relates to a tyre as defined above in which the composition comprises less than 50 phr of reinforcing filler. Preferably, the content of reinforcing filler is within a range extending from 5 to 45 phr. More preferably, the content of reinforcing filler is within a range extending from 10 to 40 phr and preferably from 15 to 35 phr. Preferably, the reinforcing filler is carbon black, silica or a mixture of thereof. Preferably, the reinforcing filler is predominantly composed of carbon black. Alternatively and again preferably, the reinforcing filler is predominately composed of silica.

Preferably, the invention relates to a tyre as defined above in which the ratio of the content of filler to the content of polyfunctional acrylate derivative is less than or equal to 3.5, preferably less than or equal to 3. Preferably, the ratio of the content of filler to the content of polyfunctional acrylate derivative is within a range extending from 0.3 to 3 and preferably from 1 to 3.

Preferably, the invention relates to a tyre as defined above in which the composition does not contain molecular sulphur or a sulphur-donating agent as vulcanization agent or contains less than 0.5 phr thereof. Preferably, the composition does not contain molecular sulphur or a sulphur-donating agent as vulcanization agent or contains less than 0.3 phr and preferably less than 0.1 phr thereof.

Preferably, the invention relates to a tyre as defined above in which the composition does not contain a vulcanization accelerator. Preferably again, the composition does not contain an antioxidant.

Preferably again, the invention relates to a tyre as defined above in which the composition additionally comprises a plasticizer preferably chosen from plasticizing resins, extending oils and their mixtures.

Preferably, the invention relates to a tyre as defined above in which the composition as specified above is that of the tread or of an internal layer of said tyre.

Preferably, the tyre according to the invention will be chosen from the tyres intended to equip a two-wheel vehicle, a passenger vehicle, or also a "heavy-duty" vehicle (that is to say, underground, bus, off-road vehicles, heavy road transport vehicles, such as lorries, tractors or trailers), or also aircraft, construction equipment, heavy agricultural vehicles or handling vehicles.

DETAILED DESCRIPTION OF EMBODIMENTS OF THE INVENTION

I—Constituents of the Tyre Composition

The tyre rubber composition according to the invention is based on the following constituents: a polyfunctional acrylate derivative of formula (I) and a peroxide, the contents of polyfunctional acrylate derivative and of peroxide being such that the ratio of the content of polyfunctional acrylate derivative to the content of peroxide is greater than or equal to 6.

In the present patent application, the expression "phr" means, in a known way, parts by weight per hundred parts by weight of elastomer. The amount by weight of the constituents of the compositions is thus expressed with respect to the total amount of elastomers by weight conventionally considered at the hundred value.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Within the meaning of the present invention and in a way known to a person skilled in the art, tread is understood to mean the layer of the tyre which is in contact with the running surface. This is because it is possible to define, within the tyre, three types of regions:

The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The radially interior region in contact with the inflation gas, this region generally being composed of the layer airtight to the inflation gases, sometimes known as inner liner.

The radially exterior region in contact with the ambient air, this region being essentially composed of the tread and of the external sidewall of the tyre. The tread of the tyre is positioned radially above the tyre belt and thus constitutes the layer in contact with the running surface.

I-1 Diene Elastomer

The tyre compositions of the invention can contain just one diene elastomer or a mixture of several diene elastomers.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the tyre compositions according to the invention is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinyl naphthalene.

The copolymers can contain between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used as a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

To summarize, the diene elastomer of the composition is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

According to a specific embodiment, the composition comprises from 50 to 100 phr of an SBR elastomer, whether an SBR prepared in emulsion ("ESBR") or an SBR prepared in solution ("SSBR").

According to another specific embodiment, the diene elastomer is an SBR/BR blend (mixture).

According to other possible embodiments, the diene elastomer is an SBR/NR (or SBR/IR), BR/NR (or BR/IR) or also SBR/BR/NR (or SBR/BR/IR) blend.

In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

In the case of an NBR elastomer, use is made in particular of an NBR having an acrylonitrile content of between 15% and 40% by weight, a content of vinyl bonds of the butadiene part of between 15% and 70% and a content (mol %) of trans-1,4-bonds of between 15% and 75%.

According to a preferred embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably selected from the group consisting of S-SBRs, E-SBRs, natural rubber, synthetic polyisoprenes (exhibiting a content (mol %) of cis-1,4-enchainments preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) exhibiting a content (mol %) of cis-1,4-enchainments of greater than 90%.

According to another specific embodiment of the invention, the rubber composition comprises, for example, between 30 and 90 phr, in particular between 40 and 90 phr, of a high Tg elastomer as a blend with a low Tg elastomer.

According to another specific embodiment of the invention, the diene elastomer of the composition according to the invention comprises a blend of a BR (as low Tg elastomer) exhibiting a content (mol %) of cis-1,4-enchainments of greater than 90% with one or more S-SBRs or E-SBRs (as high Tg elastomer(s)).

I-2 Polyfunctional Acrylate Derivative

The tyre according to the invention comprises a composition which comprises a polyfunctional acrylate derivative of formula (Ia) or (Ib):

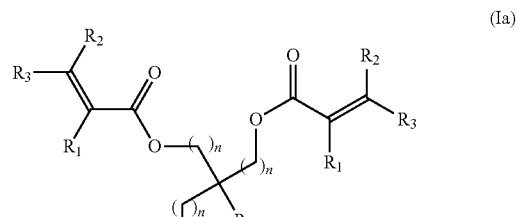
(Ia)

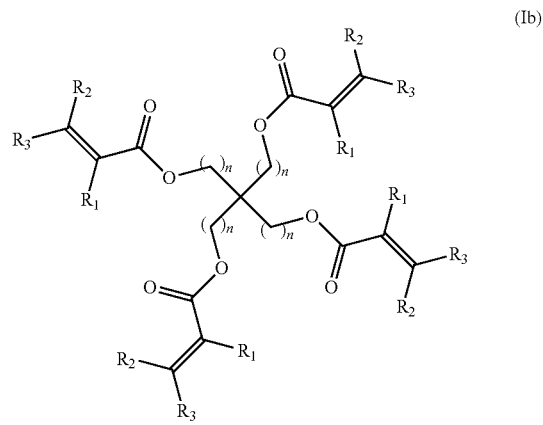
(Ib)

in which $R_1$, $R_2$ and $R_3$ independently represent a hydrogen atom or a $C_1$-$C_7$ hydrocarbon group selected from the group consisting of linear, branched or cyclic alkyls, aralkyl groups, alkylaryl groups and aryl groups and optionally interrupted by one or more heteroatoms, it being possible for $R_2$ and $R_3$ to together form a nonaromatic ring, n represents an integer having the value 1, 2 or 3 and, in the case of a polyfunctional acrylate derivative of formula (Ia), $R_4$ represents a radical selected from the group consisting of a hydrogen atom, a methyl group, an ethyl group, a propyl group or an isopropyl group.

Cyclic alkyl group is understood to mean an alkyl group comprising one or more rings.

Hydrocarbon group or chain interrupted by one or more heteroatoms is understood to mean a group or chain comprising one or more heteroatoms, each heteroatom being between two carbon atoms of said group or said chain or between a carbon atom of said group or said chain and another heteroatom of said group or said chain or between two other heteroatoms of said group or said chain.

The heteroatom or heteroatoms can be a nitrogen, sulphur or oxygen atom.

Preferably, in the above formulae (Ia) and (Ib), $R_1$, $R_2$ and $R_3$ independently represent a hydrogen atom or a methyl group. More preferably, $R_2$ and $R_3$ each represent a hydrogen atom and, according to an also very preferred alternative, $R_1$ represents a methyl group.

Preferably, n is equal to 1 in the above formulae (Ia) and (Ib).

Preferably, in the case of a polyfunctional acrylate derivative of formula (Ia), $R_4$ represents an ethyl group.

In the tyre composition according to the invention, the amount of polyfunctional acrylate derivative is preferably within a range extending from 10 to 70 phr, preferably from 10 to 60 phr. Above a content of 70 phr, the dispersion is poorer and the properties of the composition may deteriorate, whereas, below a content of 10 phr, the effect of the polyfunctional acrylate derivative is less noteworthy with regard to the stiffening and the reinforcing.

By way of example, polyfunctional acrylate derivatives, such as trimethylolpropane trimethacrylate (TMPTMA) "SR351" from Sartomer, are available commercially.

I-3 Peroxide

In addition to the diene elastomer and the polyfunctional acrylate derivative which are described above, the tyre composition of the invention uses a peroxide, which can be any peroxide known to a person skilled in the art.

Among the peroxides well known to a person skilled in the art, it is preferable to use, for the invention, a peroxide chosen from the family of the organic peroxides and in particular a peroxide chosen from dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane and the mixtures of these.

Various packaged products, known under their trade names, are available commercially; mention may be made of Dicup from Hercules Powder Co., Perkadox Y12 from Noury van der Lande, Peroximon F40 from Montecatini Edison S.p.A., Trigonox from Noury van der Lande, Varox from R.T. Vanderbilt Co. or else Luperko from Wallace & Tiernan Inc.

Preferably, the amount of peroxide to be used for the requirements of the invention is less than or equal to 3 phr. Preferably, the amount of peroxide in the composition is within a range extending from 0.1 to 3 phr. This is because, below an amount of 0.1 phr, the effect of the peroxide is not noteworthy, whereas, above 3 phr, the elongation at break and thus the strength properties of the composition are weakened. More preferably, the amount of peroxide in the composition is within a range extending from 0.2 to 2 phr, preferably from 0.25 to 1 phr.

Whatever the amounts of polyfunctional acrylate derivative and of peroxide seen above, it is important for the invention for the ratio of the content of polyfunctional acrylate derivative to the content of peroxide to be greater than or equal to 6. Below such a ratio of the contents, the synergy between the polyfunctional acrylate derivative and the peroxide is not as effective in terms of effect on the rheometry and on the elongation at break, in particular for a composition subjected to the stresses of a tyre.

Preferably, the ratio of the content of polyfunctional acrylate derivative to the content of peroxide is greater than or equal to 7, preferably greater than or equal to 8 and more preferably greater than or equal to 10. More preferably, the ratio of the content of polyfunctional acrylate derivative to the content of peroxide is between 10 and 110, preferably between 10 and 70 and more preferably between 10 and 40.

I-4 Reinforcing Filler

The tyre composition according to the invention also comprises a reinforcing filler.

The physical state under which the reinforcing filler is provided is not important, whether it is in the form of a powder, of microbeads, of granules, of beads or any other appropriate densified form.

Use may be made of any type of reinforcing filler known for its abilities to reinforce a rubber composition which can be used in the manufacture of tyres, for example an organic filler, such as carbon black, a reinforcing inorganic filler, such as silica, or also a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can also contain one type of silica or a blend of several silicas. The silica used can be any reinforcing silica known to a person skilled in the art, in particular any precipitated or fumed silica exhibiting a BET specific surface and a CTAB specific surface which are both less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16837.

The silica preferably has a BET specific surface of between 45 and 400 m$^2$/g, more preferably of between 60 and 300 m$^2$/g.

A person skilled in the art will understand that, as filler equivalent to silica described in the present section, use might be made of a reinforcing filler of another nature, in particular organic nature, provided that this reinforcing filler is covered with a layer of silica or else comprises functional sites, in particular hydroxyl sites, at its surface which require the use of a coupling agent in order to form the bond between the filler and the elastomer.

The fraction by volume of reinforcing filler in the rubber composition is defined as being the ratio of the volume of the reinforcing filler to the volume of all the constituents of the composition, it being understood that the volume of all the constituents is calculated by adding together the volumes of each of the constituents of the composition. The fraction by volume of reinforcing filler in a composition is thus defined as the ratio of the volume of the reinforcing filler to the sum of the volumes of each of the constituents of the composition and, preferably, this fraction by volume is between 5% and 20% and preferably between 5% and 15%. In an equivalent preferred way, the content of total reinforcing filler (carbon black and/or silica) is of less than 50 phr, preferably from 5 to 45 phr, more preferably from 10 to 40 phr and very preferably from 15 to 35 phr.

This is because an advantage of the invention is that of making it possible to reduce the content of reinforcing filler without loss in performance. Above a content of 50 phr, this advantage is no longer as great and the hysteresis of the composition increases.

Thus, preferably, the ratio of the content of filler to the content of polyfunctional acrylate derivative is less than or equal to 3.5 and preferably less than or equal to 3. More preferably, this ratio is within a range extending from 0.3 to 3 and preferably from 1 to 3.

Preferably, the tyre composition according to the invention predominantly comprises carbon black as reinforcing filler. Alternatively and also preferably, the tyre composition according to the invention predominantly comprises silica as reinforcing filler. Predominant reinforcing filler is understood to mean that which exhibits the greatest content among the reinforcing fillers present in the composition. Predominant reinforcing filler is understood in particular to mean any reinforcing filler which represents at least 50% by weight of the reinforcing fillers present, preferably more than 50% and more preferably more than 60%.

These compositions can also optionally contain, in addition to the reinforcing fillers and in particular when silica is used in the tyre composition according to the invention, coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made in particular, as coupling agent, of silane polysulphides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (III):

Z-A-S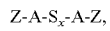-A-Z,　　(III)

in which:

x is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

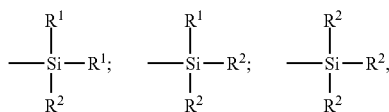

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (II), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula $[(C_2H_5O)_3Si(CH_2)_3S_2]_2$, or bis(3-triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in Patent Application WO 02/083782 (or US 2004/132880).

Mention will also be made, as coupling agent other than an alkoxysilane polysulphide, of bifunctional POSs (polyorganosiloxanes) or else of hydroxysilane polysulphides ($R^2$=OH in the above formula III), such as described in Patent Applications WO 02/30939 (or U.S. Pat. No. 6,774, 255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions of use in the invention, the content of coupling agent is preferably between 1 and 5 phr, more preferably between 1 and 4 phr and more preferably still between 1 and 3.5 phr.

I-5 Vulcanization System

The tyre composition according to the invention does not require a vulcanization system, which is one of its advantages since this makes it possible to simplify the formulation, and the preparation of the composition. If, however, a vulcanization system is present in the composition, it is preferably present in small amounts explained below.

The vulcanization system proper is generally based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

Molecular sulphur (or equivalently agents which donate molecular sulphur), when it is used, is used at a content preferentially of less than 0.5 phr, preferably of less than 0.3 phr and more preferably at a content of less than 0.1 phr. Very preferably, the composition is devoid of molecular sulphur.

The vulcanization system of the composition according to the invention can also comprise one or more additional accelerators, for example compounds of the family of the thiurams, zinc dithiocarbamate derivatives, sulphenamides, guanidines or thiophosphates. Use may in particular be made of any compound capable of acting as accelerator for the vulcanization of diene elastomers in the presence of sulphur, in particular accelerators of the thiazole type, and also their derivatives, and accelerators of thiuram and zinc dithiocarbamate type. These accelerators are more preferably selected from the group consisting of 2-mercaptobenzothiazyl disulphide (abbreviated to MBTS), N-cyclohexyl-2-benzothiazolesulphenamide (abbreviated to CBS), N,N-dicyclohexyl-2-benzothiazolesulphenamide (abbreviated to DCBS), N-(tert-butyl)-2-benzothiazolesulphenamide (abbreviated to TBBS), N-(tert-butyl)-2-benzothiazolesulphenimide (abbreviated to TBSI), zinc dibenzyldithiocarbamate (abbreviated to ZBEC) and the mixtures of these compounds. Preferably, use is made of a primary accelerator of the sulphenamide type.

If an accelerator is used, it is used at contents such as those used by a person skilled in the art of vulcanized compositions for tyres. Nevertheless, the tyre composition according to the invention is preferably devoid of any vulcanization accelerator.

I-6 Other Possible Additives

The tyre compositions in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing agents, such as those provided below, anti-fatigue agents, reinforcing resins, or methylene acceptors (for example novolak phenolic resin) or donors (for example HMT or H3M).

According to a preferred form, the tyre composition of the invention is devoid of antioxidant.

According to a preferred form, the tyre composition of the invention is devoid of plasticizing agent. Alternatively and according to an also preferred embodiment, the composition according to the invention additionally comprises a plasticizing agent. Preferably, this plasticizing agent is a solid hydrocarbon resin (or plasticizing resin), an extending oil (or plasticizing oil) or a mixture of the two.

When it is included in the composition, the content of total plasticizing agent is preferably greater than or equal to 5 phr, more preferably from 5 to 100 phr, in particular from 10 to 80 phr, for example from 15 to 70 phr.

According to a first preferred embodiment of the invention, the plasticizer is an extending oil which is liquid at 20° C., referred to as "low Tg", that is to say which, by definition, exhibits a Tg of less than −20° C., preferably of less than −40° C.

Any extending oil, whether it is of aromatic or non-aromatic nature, known for its plasticizing properties with regard to diene elastomers can be used. At ambient temperature (20° C.), these oils, which are more or less viscous, are liquids (that is to say, as a reminder, substances which have the ability to eventually assume the shape of their container), in contrast in particular to plasticizing hydrocarbon resins, which are by nature solids at ambient temperature.

Extending oils selected from the group consisting of naphthenic oils (low or high viscosity, in particular hydrogenated or not), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulphonate plasticizers and the mixtures of these compounds are particularly suitable. For example, mention may be made of those which comprise between 12 and 30 carbon atoms, for example trioctyl phosphate. Mention may in particular be made, as examples of non-aqueous and water-insoluble ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferably for more than 80%, by weight) of an unsaturated $C_{18}$ fatty acid, that is to say selected from the group consisting of oleic acid, linoleic acid, linolenic acid and the mixtures of these acids. More preferably, whether it is of synthetic origin or natural origin (case, for example, of sunflower or rapeseed vegetable oils), the fatty acid used is composed for more than 50% by weight, more preferably still for more than 80% by weight, of oleic acid. Such triesters (trioleates) having a high content of oleic acid are well known; they have been described, for example, in Application WO 02/088238 as plasticizing agents in tyre treads.

According to another preferred embodiment of the invention, this plasticizing agent is a thermoplastic hydrocarbon resin, the Tg of which is greater than 0° C., preferably greater than 20° C. This resin is a solid at ambient temperature (23° C.), in contrast to a liquid plasticizing compound, such as an oil.

Preferably, the thermoplastic plasticizing hydrocarbon resin exhibits at least any one of the following characteristics:
- a Tg of greater than 20° C., more preferably of greater than 30° C.;
- a number-average molecular weight (Mn) of between 400 and 2000 g/mol, more preferably between 500 and 1500 g/mol;
- a polydispersity index (PI) of less than 3, more preferably of less than 2 (as a reminder: PI=Mw/Mn with Mw being the weight-average molecular weight).

More preferably, this thermoplastic plasticizing hydrocarbon resin exhibits all of the preferred characteristics above.

The macrostructure (Mw, Mn and PI) of the hydrocarbon resin is determined by steric exclusion chromatography (SEC); solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 Waters columns in series (Styragel HR4E, HR1 and HR0.5); detection by differential refractometer (Waters 2410) and its associated operating software (Waters Empower).

The thermoplastic hydrocarbon resins can be aliphatic or aromatic or also of the aliphatic/aromatic type, that is to say based on aliphatic and/or aromatic monomers. They can be natural or synthetic and based or not based on petroleum (if such is the case, they are also known under the name of petroleum resins).

Suitable as aromatic monomers are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic monomer is styrene or a vinylaromatic monomer resulting from a $C_9$ fraction (or more generally from a $C_8$ to $C_{10}$ fraction). Preferably, the vinylaromatic monomer is the minor monomer, expressed as molar fraction, in the copolymer under consideration.

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and the mixtures of these resins, which can be used alone or in combination with a liquid plasticizer, for example an MES or TDAE oil. The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Mention will in particular be made, among the above plasticizing hydrocarbon resins, of α-pinene, β-pinene, dipentene or polylimonene homo- or copolymer resins.

The preferred resins above are well known to a person skilled in the art and are commercially available, for example sold as regards:
  polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);
  $C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and Escorez 1273;
  limonene/styrene copolymer resins: by DRT under the name Dercolyte TS 105 from DRT or by Arizona Chemical Company under the names ZT115LT and ZT5100.

Mention may also be made, as examples of other preferred resins, of phenol-modified α-methylstyrene resins. In order to characterize these phenol-modified resins, it should be remembered that a number referred to as "hydroxyl number" (measured according to Standard ISO 4326 and expressed in mg KOH/g) is used in a known way. α-Methylstyrene resins, in particular phenol-modified ones, are well known to a person skilled in the art and are commercially available, for example sold by Arizona Chemical under the names Sylvares SA 100 (Mn=660 g/mol; PI=1.5; Tg=53° C.); Sylvares SA 120 (Mn=1030 g/mol; PI=1.9; Tg=64° C.); Sylvares 540 (Mn=620 g/mol; PI=1.3; Tg=36° C.; hydroxyl number=56 mg KOH/g); and Silvares 600 (Mn=850 g/mol; PI=1.4; Tg=50° C.; hydroxyl number=31 mg KOH/g).

It is obvious that the invention relates to the tyres provided with the treads comprising the rubber compositions described above, both in the "raw" or non-crosslinked state (i.e., before curing) and in the "cured" or crosslinked, or else vulcanized, state (i.e., after crosslinking or vulcanization).

II—Preparation of the Rubber Compositions

The compositions are manufactured in appropriate mixers, using two successive phases of preparation which are well known to a person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system and in particular the peroxide of the compositions according to the invention is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers and the reinforcing fillers (and optionally the coupling agents and/or other ingredients) are introduced into an appropriate mixer, such as an ordinary internal mixer, at a temperature of between 20° C. and 100° C. and preferably between 25° C. and 100° C. After a few minutes, preferably from 0.5 to 2 min, and a rise in the temperature to 90° C. to 100° C., the other ingredients (that is to say, those which remain, if not all were added at the start) are added all at once or in portions, with the exception of the crosslinking system and in particular of the peroxide, during a mixing ranging from 20 seconds to a few minutes. The total duration of the kneading, in this non-productive phase, is preferably between 2 and 10 minutes at a temperature of less than or equal to 180° C. and preferably of less than or equal to 170° C.

After cooling the mixture thus obtained, the crosslinking system and in particular the peroxide is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for laboratory characterization, or else extruded, in order to form, for example, a rubber profiled element used in the manufacture of semi-finished products, in order to obtain products such as sidewalls, carcass ply, crown plies (or tyre belt), tread, bead-wire filling, tread underlayer or other elastomer layers, preferably the tread. These products can subsequently be used in the manufacture of tyres, according to the techniques known to a person skilled in the art.

The crosslinking (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tyre.

The examples which follow illustrate the invention without, however, limiting it.

The compositions as described in the present patent application can be used anywhere in the tyre and preferably in its tread or in an internal layer of this tyre. This is because it is possible to define, within the tyre, three types of regions:

The radially exterior region in contact with the ambient air, this region being essentially composed of the tread and of the external sidewall of the tyre.

The radially interior region in contact with the inflation gas, this region generally being composed of the layer airtight to the inflation gases, sometimes known as inner liner.

The internal region of the tyre, that is to say that between the exterior and interior regions. This region includes layers or plies which are referred to here as tyre internal layers. These are, for example, carcass plies, tread underlayers, tyre belt plies or any other layer which is not in contact with the ambient air or the inflation gas of the tyre.

III—Exemplary Embodiments of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Dynamic Properties (after Curing): Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation, the modulus used here being the nominal (or apparent) secant modulus measured in first elongation, calculated by reducing to the initial cross section of the test specimen. The nominal secant moduli (or apparent stresses, in MPa) are measured in first elongation at 50%, 100% and 300% elongation, respectively denoted M50, M100 and M300.

The breaking stresses (in MPa) and the elongations at break (EB in %) are also measured, at 23° C.±2° C., according to Standard NF T 46-002. The results are expressed "in base 100", that is to say with respect to the control, to which a value of 100 is assigned.

All these tensile measurements are carried out under the standard conditions of temperature (23±2° C.) and hygrometry (50±5% relative humidity), according to French Standard NF T 40-101 (December 1979).

The dynamic properties G*(10%) and tan(δ)max at 40° C. are measured on a viscosity analyser (Metravib VA4000), according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under the defined conditions of temperature, for example at 40° C., according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G* and the loss factor tan(δ). The maximum value of tan(δ) observed, denoted tan(δ)max, and the complex dynamic shear modulus G*(10%) at 10% strain, at 40° C., are shown for the return cycle.

It should be remembered that, in a way well-known to a person skilled in the art, the value of tan(δ)max at 40° C. is representative of the hysteresis of the material and thus of the rolling resistance: the lower tan(δ)max is at 40° C., the more the rolling resistance is reduced.

III-3 Examples

III-3-1 Example I

The object of this example is to compare the rubber properties of control compositions with compositions in accordance with the invention, having carbon black as filler. The compositions tested are presented in Table 1 below.

TABLE 1

|  | C1 | C2 | C3 | C4 | C5 | C6 | I1 | I2 |
|---|---|---|---|---|---|---|---|---|
| NR (1) | 100 | 100 | 100 | 100 | 100 | 100 | 100 | 100 |
| Black (2) | 50 | 50 | 0 | 20 | 40 | 0 | 20 | 40 |
| TMPTMA (3) | — | 5 | — | — | — | 17 | 17 | 17 |
| Peroxide (4) | — | 3 | 1.5 | 1.5 | 1.5 | 1.5 | 1.5 | 1.5 |
| TMPTMA/Peroxide | — | 1.7 | — | — | — | 11.3 | 11.3 | 11.3 |
| Filler/TMPTMA | — | 10.0 | — | — | — | 0.0 | 1.2 | 2.4 |
| Stearic acid (5) | 0.5 | 0.5 | 0.5 | 0.5 | 0.5 | 0.5 | 0.5 | 0.5 |
| ZnO (6) | 7 | 7 | 7 | 7 | 7 | 7 | 7 | 7 |
| 6-PPD (7) | 1.5 | — | — | — | — | — | — | — |
| Accelerator (8) | 0.8 | — | — | — | — | — | — | — |
| Sulphur | 4.5 | — | — | — | — | — | — | — |

(1) Natural rubber
(2) Carbon black, ASTM grade N326 from Cabot
(3) Trimethylolpropane trimethacrylate (TMPTMA), SR351 from Sartomer
(4) Dicumyl peroxide, Dicup from Hercules
(5) Stearin, Pristerene 4931 from Uniqema
(6) Zinc oxide, industrial grade-Umicore
(7) N-(1,3-Dimethylbutyl)-N'-phenyl-p-phenylenediamine, Santoflex 6-PPD from Flexsys
(8) N,N-Dicyclohexyl-2-benzothiazolesulphenamide Santocure DCBS from Flexsys The properties measured for the different compositions are given in Table 2 below.

TABLE 2

|  | C1 | C2 | C3 | C4 | C5 | C6 | I1 | I2 |
|---|---|---|---|---|---|---|---|---|
| EB (%) | 480 | 200 | 380 | 310 | 305 | 210 | 330 | 320 |
| M300 | 11 | / | 2 | 6 | 11 | / | 11 | 14.5 |
| Tan(δ)max at 40° C. | 0.19 | 0.18 | 0.06 | 0.11 | 0.15 | 0.07 | 0.13 | 0.16 |

In comparison with the control compositions, it is noted that the composition I1 is at the same level of reinforcement (represented by M300) as the control compositions C1 and C5 but with a greatly reduced hysteresis. The composition I3 makes it possible to achieve a high level of reinforcement (M300) while retaining a low hysteresis and a good cohesion (represented by the elongation at break).

III-3-2 Example II

The object of this example is to compare the rubber properties of control compositions with compositions in accordance with the invention, having silica as filler. The compositions tested are presented in Table 3 below.

TABLE 3

|  | C7 | C8 | C9 | C10 | C11 | I3 | I4 |
|---|---|---|---|---|---|---|---|
| NR (1) | 100 | 100 | 100 | 100 | 100 | 100 | 100 |
| Silica (2) | 50 | 0 | 20 | 40 | 0 | 20 | 40 |
| TMPTMA (3) | 5 | — | — | — | 17 | 17 | 17 |
| Peroxide (4) | 3 | 1.5 | 1.5 | 1.5 | 1.5 | 1.5 | 1.5 |
| TMPTMA/Peroxide | 1.7 | — | — | — | 11.3 | 11.3 | 11.3 |
| Filler/TM PTMA | 10.0 | — | — | — | 0.0 | 1.2 | 2.4 |
| Stearic acid (5) | 0.5 | 0.5 | 0.5 | 0.5 | 0.5 | 0.5 | 0.5 |
| ZnO (6) | 7 | 7 | 7 | 7 | 7 | 7 | 7 |
| Coupling agent (7) | 4 | — | 1.6 | 3.2 | — | 1.6 | 3.2 |

(1) Natural rubber
(2) Silica 160 MP, Zeosil 1165 MP from Rhodia
(3) Trimethylolpropane trimethacrylate (TMPTMA), SR351 from Sartomer
(4) Dicumyl peroxide, Dicup from Hercules
(5) Stearin, Pristerene 4931 from Uniqema
(6) Zinc oxide, industrial grade-Umicore
(7) TESPT coupling agent, Si69 from Evonik The properties measured for the different compositions are given in Table 4 below.

TABLE 4

|  | C7 | C8 | C9 | C10 | C11 | I3 | I4 |
|---|---|---|---|---|---|---|---|
| EB (%) | 230 | 390 | 320 | 310 | 200 | 400 | 460 |
| M300 | / | 1.3 | 3.5 | 6 | / | 9 | 13.5 |
| Tan(δ)max at 40° C. | 0.17 | 0.05 | 0.07 | 0.09 | 0.05 | 0.07 | 0.18 |

In comparison with the control compositions, it is noted that the compositions I3 and I4 make it possible to achieve a strong reinforcement (M300) with a low hysteresis and while retaining a good cohesion (elongation at break).

The invention claimed is:

1. A tire comprising a rubber composition based on at least one diene elastomer, a reinforcing filler, a peroxide, and a polyfunctional acrylate derivative of formula (Ia) or (Ib):

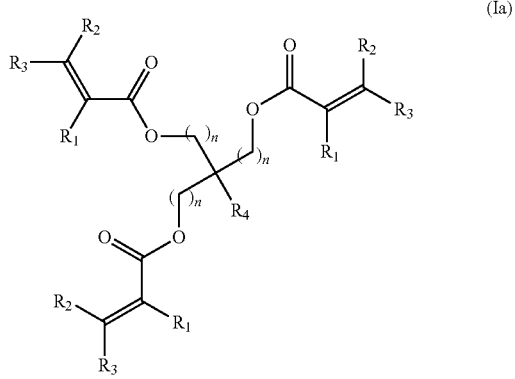

(Ia)

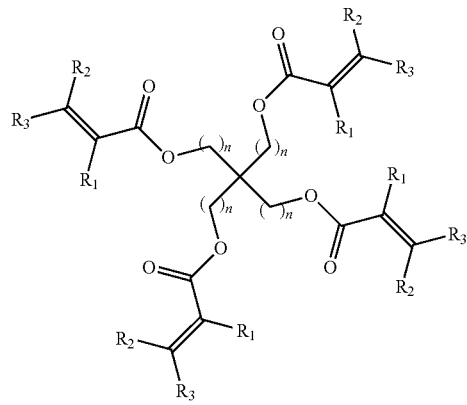

(Ib)

in which $R_1$, $R_2$ and $R_3$ independently represent a hydrogen atom or a $C_1$-$C_7$ hydrocarbon group selected from the group consisting of linear, branched or cyclic alkyls, aralkyl groups, alkylaryl groups and aryl groups and optionally interrupted by one or more heteroatoms, it being possible for $R_2$ and $R_3$ to together form a nonaromatic ring, n represents an integer having the value 1, 2 or 3 and, in the case of a polyfunctional acrylate derivative of formula (Ia), $R_4$ represents a radical selected from the group consisting of a hydrogen atom, a methyl group, an ethyl group, a propyl group or an isopropyl group,
wherein the contents of polyfunctional acrylate derivative and of peroxide are such that the ratio of the content of polyfunctional acrylate derivative to the content of peroxide is greater than or equal to 6.

2. The tire according to claim 1, wherein $R_1$, $R_2$ and $R_3$ independently represent a hydrogen atom or a methyl group.

3. The tire according to claim 1, wherein $R_2$ and $R_3$ each represents a hydrogen atom.

4. The tire according to claim 1, wherein $R_1$ represents a methyl group.

5. The tire according to claim 1, wherein n represents the integer 1.

6. The tire according to claim 1, wherein the polyfunctional acrylate derivative is a compound of formula (Ia).

7. The tire according to claim 6, wherein $R_4$ represents an ethyl group.

8. The tire according to claim 1, wherein the polyfunctional acrylate derivative is a compound of formula (Ib).

9. The tire according to claim 1, wherein an amount of polyfunctional acrylate derivative in the composition is within a range extending from 10 to 70 phr (parts by weight per hundred parts by weight of elastomer).

10. The tire according to claim 1, wherein the peroxide in the composition is an organic peroxide.

11. The tire according to claim 1, wherein an amount of peroxide in the composition is less than or equal to 3 phr.

12. The tire according to claim 1, wherein the ratio of the content of polyfunctional acrylate derivative to the content of peroxide is greater than or equal to 7.

13. The tire according to claim 1, wherein the at least one diene elastomer is selected from the group consisting of polybutadienes, synthetic polyisoprenes, natural rubber, butadiene copolymers, isoprene copolymers and mixtures thereof.

14. The tire according to claim 13, wherein the at least one diene elastomer is selected from the group consisting of polybutadienes, synthetic polyisoprenes, natural rubber, copolymers of butadiene and styrene, copolymers of butadiene and acrylonitrile, copolymers of isoprene and styrene, and mixtures thereof.

15. The tire according to claim 1, wherein the composition comprises less than 50 phr of reinforcing filler.

16. The tire according to claim 1, wherein the reinforcing filler is carbon black, silica or a mixture thereof.

17. The tire according to claim 1, wherein the reinforcing filler is predominantly composed of carbon black.

18. The tire according to claim 1, wherein the reinforcing filler is predominantly composed of silica.

19. The tire according to claim 1, wherein a ratio of the total content of filler to the content of polyfunctional acrylate derivative is less than or equal to 3.5.

20. The tire according to claim 1, wherein the composition does not contain molecular sulfur or a sulfur-donating agent as vulcanization agent or contains less than 0.5 phr thereof.

21. The tire according to claim 1, wherein the composition does not contain a vulcanization accelerator.

22. The tire according to claim 1, wherein the composition does not contain an antioxidant.

23. The tire according to claim 1, wherein the composition additionally comprises a plasticizer.

24. The tire according to claim 23, wherein the plasticizer is selected from the group consisting of plasticizing resins, extending oils and mixtures thereof.

25. The tire according to claim 1, wherein the composition is used in a tread or an internal layer of the tire.

* * * * *